(12) United States Patent
Kajander et al.

(10) Patent No.: US 7,462,259 B2
(45) Date of Patent: *Dec. 9, 2008

(54) METHOD OF MAKING COATED MAT ONLINE

(75) Inventors: Richard Emil Kajander, Toledo, OH (US); Alan Michael Jaffee, Bowling Green, OH (US); Glenda B. Bennett, Toledo, OH (US)

(73) Assignee: Johns Mnaville, Denver, CO (US)

( * ) Notice: Subject to any disclaimer, the term of this patent is extended or adjusted under 35 U.S.C. 154(b) by 145 days.

This patent is subject to a terminal disclaimer.

(21) Appl. No.: 10/965,131

(22) Filed: Oct. 14, 2004

(65) Prior Publication Data

US 2005/0136241 A1 Jun. 23, 2005

Related U.S. Application Data

(63) Continuation of application No. 10/209,092, filed on Jul. 31, 2002, now abandoned, which is a continuation-in-part of application No. 09/923,932, filed on Aug. 7, 2001, now Pat. No. 6,723,670.

(51) Int. Cl.
*D21H 19/70* (2006.01)
*D21H 19/44* (2006.01)

(52) U.S. Cl. ........................ 162/135; 162/145; 162/156; 162/169; 162/185; 427/389.7; 427/391; 427/395

(58) Field of Classification Search ................. 162/135, 162/145, 156, 169, 185; 427/389.7, 391, 427/395
See application file for complete search history.

(56) References Cited

U.S. PATENT DOCUMENTS

| | | | | |
|---|---|---|---|---|
| 2,526,125 A * | 10/1950 | Francis, Jr. | ................. | 162/146 |
| 4,018,647 A * | 4/1977 | Wietsma | ................. | 162/168.1 |
| 4,606,944 A * | 8/1986 | Lauchenauer | ............... | 427/296 |
| 5,089,296 A * | 2/1992 | Bafford et al. | ............... | 427/208 |
| 6,008,147 A * | 12/1999 | Jaffee | ......................... | 442/331 |
| 6,365,533 B1* | 4/2002 | Horner et al. | ................ | 442/374 |
| 6,875,308 B2* | 4/2005 | Kajander et al. | ............. | 162/135 |
| 2002/0092635 A1* | 7/2002 | Capizzi | ....................... | 162/158 |

* cited by examiner

*Primary Examiner*—Eric Hug
*Assistant Examiner*—Dennis Cordray
(74) *Attorney, Agent, or Firm*—Robert D. Touslee

(57) ABSTRACT

New coated nonwoven fibrous mats having properties particularly suited for a facer on gypsum wallboard and other substrates and in laminates of various types, and the method of making the coated mat is disclosed. The mat preferably contains a major portion of glass fibers and a minor portion of a resinous binder. The coating is preferably permeable and reduces fiber dust and abrasion experienced in the past with relatively coarse, relatively inexpensive glass fibers in the mat. Contrary to previous coating methods, the coated fibrous mat is made in-line on a wet mat forming production line by applying a wet foam binder onto a wet, fibrous web followed by drying and curing in-line.

37 Claims, 6 Drawing Sheets

METHOD OF MAKING COATED MAT ONLINE

This application is a continuation of application Ser. No. 10/209,092 filed Jul. 31, 2002, and now abandoned, which application was a continuation-in-part of application Ser. No. 09/923,932 filed on Aug. 7, 2001 and now U.S. Pat. No. 6,723,670 issued Apr. 20, 2004.

BACKGROUND OF THE INVENTION

The present invention involves a process of coating a wet, non-woven fiber glass mat with foam or froth on the same wet process line used to make the mat, as an intermediate step in the mat manufacturing process, and the coated fiber glass mat products that result. These coated mats have many uses, but are especially useful as a facing on a gypsum wallboard for exterior application and on which stucco is applied.

Fibrous non-woven mats are often formed into a wet mat from an aqueous dispersion of fibers such as glass and/or synthetic organic fibers can include other fibers such as cellulose fibers, ceramic fibers, etc. and can also include particles of inorganic material and/or plastics. Usually a solution of urea formaldehyde resin, usually modified with a thermoplastic polymer, or one of many other known resin binders is applied to a the wet non-woven web of fibers and then, after removing excess binder and water, the bindered web is dried and heated further to cure the urea formaldehyde resin or other resin binder to form a non-woven mat product. A typical process is disclosed in U.S. Pat. Nos. 4,112,174 and 3,766, 003, the disclosures of which are hereby incorporated herein by reference.

The fiberglass mat (Johns Manville's 7502 Mat—99 gms/square meter) made using a binder of modified urea formaldehyde resin performed good in the process disclosed in U.S. Pat. No. 4,647,496 to make a faced insulating gypsum board, also disclosed in that patent, but the mat was not as strong as desired which caused process breakouts adding to production costs. This mat was also more rigid than desired Which made it difficult to fold around the edges of the board and also irritated the hands and arms of the workers handling and installing the insulating board product. Further, when the faced insulated gypsum board was cut, the dust from the mat was excessive and further irritated those it contacted, particularly if the workers bare arms, etc. were sweaty and exposed to the dust. Skin abrasion and irritation was also a problem for those handling the mat and the faced board when not wearing gloves and long sleeve shirts.

To address the inadequate strength problem a small portion of polyester, polyethylene terathalate (PET), fibers were used in place of an equal amount of glass fibers and the urea formaldehyde resin binder was replaced with an acrylic binder containing a small amount of a stearylated melamine. This improved the strength adequately and also improved the handling characteristics of the mat somewhat, i. e. the mat is friendlier to those handling and installing the mat or board, but the acrylic bound mat is more expensive and less fire (flame) resistant. Such mats are disclosed in U.S. Pat. No. 5,772,846. While the mats disclosed by this latter reference have substantially improved "hand" and cause very little abrasion or discomfort in handling, the cost is higher, the mat is less flame resistant than the mat disclosed in U.S. Pat. No. 4,647,496 and further improvement is still desired by some users.

There still exists a need for a nonwoven fiberglass mat that has better flame resistance, lower cost and good handlability (flexible and non abrasive/non irritating to the skin).

BRIEF SUMMARY OF THE INVENTION

The present invention includes a method of making a coated fibrous non-woven mat where the fibers are preferably, but not necessarily, bonded together with a conventional mat binder comprising using a wet process to form a wet non-woven web from a low concentration aqueous slurry followed by partially dewatering the mat, preferably, but not necessarily, adding an excess of aqueous resin binder, removing some but not all of the binder, then applying an aqueous foam or froth having a high air content and a high blow ratio, onto the top of the wet mat, in-line, and then heating the mat to remove the water, and preferably to break the foam bubbles, cure the binder, and cure the coating. The aqueous foam slurry contains a foam that breaks down fairly quickly such that the mat has enough permeability to allow drying air to penetrate the mat.

The coating itself will hold the non-woven fibrous web together adequately for some applications, but it is preferred to use a conventional aqueous binder in a conventional manner to give the non-woven finished mat greater strength. The foam, preferably aqueous, is a foam having a blow ratio of at least 15 and as high as about 40, preferably at least 25, and most preferably between 19 and 28, and a foam viscosity of about 2000 to about 25,000 centipoises, preferably from about 10,000 to about 20,000 centipoises. The blow ratios stated above compute to foam densities as the foam enters the applicator of about 25 up to, preferably, at most about 67 grams per liter, most preferably from about 35 to about 53 gms/liter. Higher foam densities can be used when it is desired that the foam not collapse completely during drying and curing and/or the foam will be more heat stable by reason of different or additional amounts of surfactants an/or other foam stabilizing agents as is well known in foam technology. The viscosity, of the liquid precursor of the foam is usually at least 200 centipoises, preferably at least 500 centipoises. The foam is preferably non-draining, and has rapid bubble breaking or collapsing characteristics when heated to or near the boiling point.

While it is preferred to control the inventive process to produce mats in which the foam collapses completely or almost completely during the drying and curing, the invention also includes a method where a foam is used that does not collapse or does not collapse very much in which cases the finished mat will have a thin foamed coating which is also useful for many of the same reasons already stated for the coated mat and further to provide better thermal insulation, a cushion layer and other benefits. If the foam selected to make a cured foam coating does not collapse very much it will be necessary to substantially reduce the line speed to dry the mat or to dry and cure using a flotation dryer or sequential can dryer.

The present invention also includes the mats made by the above process, or any process wherein foam is applied to wet mat, in-line, between the wet web forming section and the drying oven comprising a non-woven fibrous mat with the fibers bound together with a resinous binder and having a dry coating on one surface of the mat, the dry coating preferably being permeable to allow the mat to breathe and to allow later coatings to penetrate the coating. The coating layer may penetrate into the non-woven fibrous mat a distance that is a small fraction of the total thickness of the mat. This mat is very useful as a facer for many products, particularly gypsum wallboard and insulating boards of various kinds. The coating ties up the fibers preventing loose fibers from or fiber ends from getting on people handling and/or installing the product faced with the coated mat and causing irritation and/or itching. The coating on the mat can contain insoluble fire retardant or in tumescent material, adhesive particles, anti-fungal particles, colorants and/or other materials for changing the appearance, opacity, function or performance of the mat surface.

The present invention provides coated nonwoven fibrous mats useful as a facer, substrate or intermediate layer in a great many products and applications and particularly as a facer on gypsum insulating board of the type described in U.S. Pat. No. 4,647,496. The mats of the present invention have one or more of improved handling characteristics, improved flame resistance, waterproofing, and improved flexibility, and a property of producing less dust, or less irritating dust, when a gypsum board faced with these mats is cut than was possible with uncoated mats used heretofore for facing insulating gypsum board. The mats of the present invention are also useful in faced foam and fibrous insulation products, automotive laminates and substrates for products like vinyl roofing and flooring products.

The present invention also provides flexible mats containing a major portion of less expensive chopped glass fibers that can be used for facing gypsum wallboard and other products. The present invention provides a low cost method of making a coated fibrous non-woven mat on a wet process line without having to coat a dried mat either in-line or off-line and without having to dry the mat a second time.

The present invention also includes laminates comprising a base layer such as gypsum wallboard or foam insulating boards, fiberglass blanket, plywood or other wood product having adhered thereto a coated fibrous non-woven mat as described above. The laminates of the present invention can also include a coated mat of the present invention as a base layer or substrate.

Preferably the inventive mats have a basis weight within the range of about 39 and about 200 grams per square meter, preferably for facing gypsum board within the range of about 89-125 gms/sq. meter and most preferably about 109-120 gms/sq. meter. Preferably the binder content of the dried and cured mats is within the range of about 15 wt. percent and about 30 wt. percent, most preferably about 20-25 wt. percent, based on the weight of the finished mat. The coated mat can have any weight of coating, but for facing gypsum board is preferably about 3-15 grams of coating per square meter of mat, on a dry basis, and most preferably from about 5 to about 10 grams per square meter. Preferably the inventive mat contains a major portion of glass fibers, but can also contain a minor portion of polymer fibers, such as PET polyester fibers, cellulosic fibers like wood pulp, and ceramic fibers, bound together with a minor portion of a conventional modified urea formaldehyde binder. Other conventional binders can be used instead of the modified UF binder such as a phenolic resin, a melamine formaldehyde, a furfural alcohol, a latex containing a mixture of a cross linked vinyl chloride acrylate copolymer having a glass transition temperature as high as about 45 degrees C., preferably about 36 degrees C., and a small amount of a stearylated melamine and other conventional mat binders.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

It is known to make reinforcing nonwoven mats from glass fibers and to use these mats as substrates in the manufacture of a large number of roofing and other products. Any known method of making nonwoven mats can be used in this invention, such as the conventional wet laid processes described in U.S. Pat. Nos. 4,129,674, 4,112,174, 4,681,802, 4,810,576, and 5,484,653, the disclosures of each being hereby incorporated herein by reference. In these processes a slurry of glass fiber is made by adding glass fiber to a typical white water in a pulper to disperse the fiber in the white water and to form a slurry having a fiber concentration of about 0.2-1.0 weight %, metering the slurry into a flow of white water to dilute the fiber concentration to 0.1 wt. percent or less, and continuously depositing this mixture onto a moving screen forming wire to dewater and form a wet nonwoven fibrous mat. This wet nonwoven mat is then conveyed through a binder application where an aqueous resinous binder is applied in excess, the surplus is removed by suction and the wet, bindered mat is then dried and the binder cured to form a nonwoven mat product.

The method of the present invention comprises a modification to the binder application portion of otherwise conventional mat making processes by adding a second applicator for applying a coating of aqueous foam or froth. Most nonwoven mat processes and forming machines are suitable for modification and use with the present invention, but preferred are the wet laid nonwoven mat processes and machines wherein an aqueous slurry containing fibers is directed onto a moving permeable screen or belt called a forming wire to form a continuous nonwoven wet fibrous mat.

Figure 1:
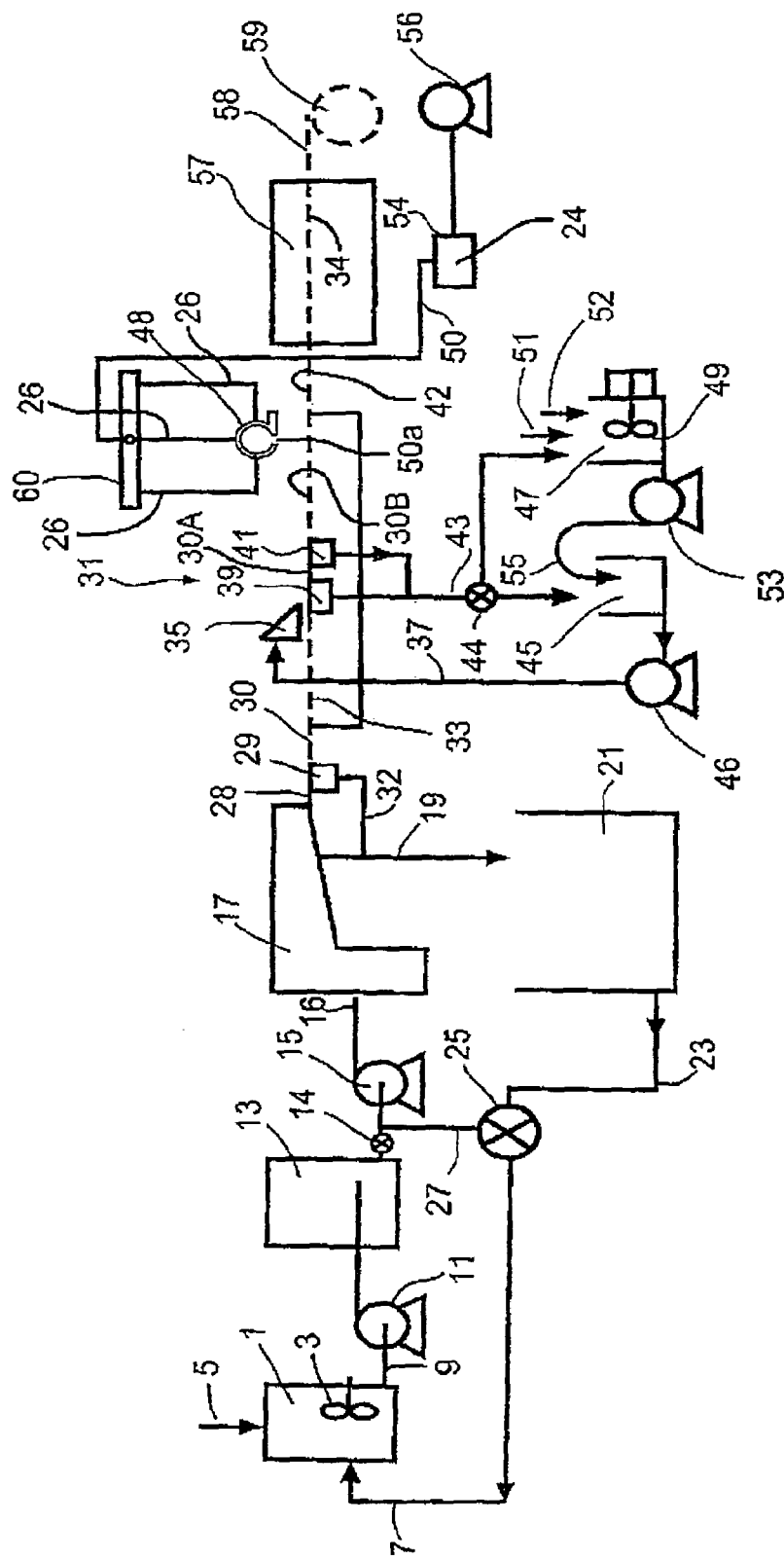
FIG. 1 is a schematic of a conventional wet mat process line having a curtain coater binder applicator and a foam applicator, for practicing the present invention.

FIG. 1 is a schematic of a preferred wet laid system for practicing the invention. Fibers 5 are fed continuously at a controlled rate into a pulper 1 along with a conventional whitewater through a pipe 7, also continuously and at a controlled rate. An agitator 3 in the pulper 1 mixes and disperses the fibers in the whitewater. The resultant concentrated fibrous slurry flows continuously through a pipe 9 into an optional pump 11 that pumps the concentrated slurry into a fiber slurry holding tank 13. The concentrated fiber slurry is preferably metered continuously from the holding tank 11 with a valve 14 and into a metered flow of deaired whitewater 27 to form a diluted fibrous slurry. The valve 25 meters a correct rate of deaired whitewater to the pulper 1 via pipe 7 and a correct rate of deaired whitewater 27 to form the diluted fiber slurry. The diluted fibrous slurry flows into pump 15 and is pumped through line 16 to the mat forming machine 17, which can be of any width and typically is wide enough to make a finished mat 12 feet wide or wider. Alternative forming methods for making the body portion of the nonwoven mat include the use of well known paper or board making processes such as cylinder forming, dry forming or air laid, etc.

The preferred processes for the production of mats of the present invention are those known processes using mat forming machines 17 like a Hydroformer™ manufactured by Voith—Sulzer of Appleton, Wis., or a Deltaformer™ manufactured by North County Engineers of Glens Falls, N.Y. In these machines, the diluted fiber slurry flows horizontally against an inclined moving permeable belt or forming wire (not shown) where the fiber is collected and builds up in a random pattern to form a wet fibrous mass 28 while the whitewater passes through the forming wire becoming somewhat foamy (due to contained air) and is transported to a deairing tank 21 via pipe 19. The wet fibrous mass 28 is dewatered to the desired level with a suction box 29 to form a wet fibrous web 30. The foamy whitewater removed is piped through pipe 32 to the deairing tank 21, preferably via the pipe 19.

This wet nonwoven fibrous web 30, the body portion, is then preferably, but not necessarily, transferred to a second permeable belt 33 and run through a dual application section 31 where first an aqueous binder mix is applied to the mat in any one of several known ways. An aqueous binder is pumped at a controlled rate from a binder mix holding tank 45 via a controlled rate pump 46 such that more binder than is needed is fed through a pipe 37 to a binder applicator such as a curtain coater 35, as is well known to have an inclined surface 38 where the binder slurry 36 flows down and is applied in excess to the wet web 30. Other types of conventional applicators can be used to apply the binder in a known manner.

The aqueous binder mix is prepared by feeding one or more aqueous resin binders 52 at a desired rate to a binder mix tank 47 having an agitator 49 therein to mix the aqueous binder(s) 52 to form a binder mix. Fibers or particles, such as microfibers, pigments, filler, etc., can also be added to the binder mix tank 47. The binder mix or slurry is then pumped to the binder holding tank 45 with a metering pump 53 and pipe 55. A metering pump 46 pumps binder mix, mixed with returned excess binder via line 43 from suction boxes 39 and 41, through line 37 to the binder applicator 35 and speeds up and slows down the pumping rate with the speed of the mat line or windup into a roll 59. The resin content in the binder mix and the degree of vacuum in the suction boxes 39 and 41 are varied to control and obtain the desired binder resin content of the mat 30A having excess binder and the bindered mat 30B in a known manner.

Figure 2:
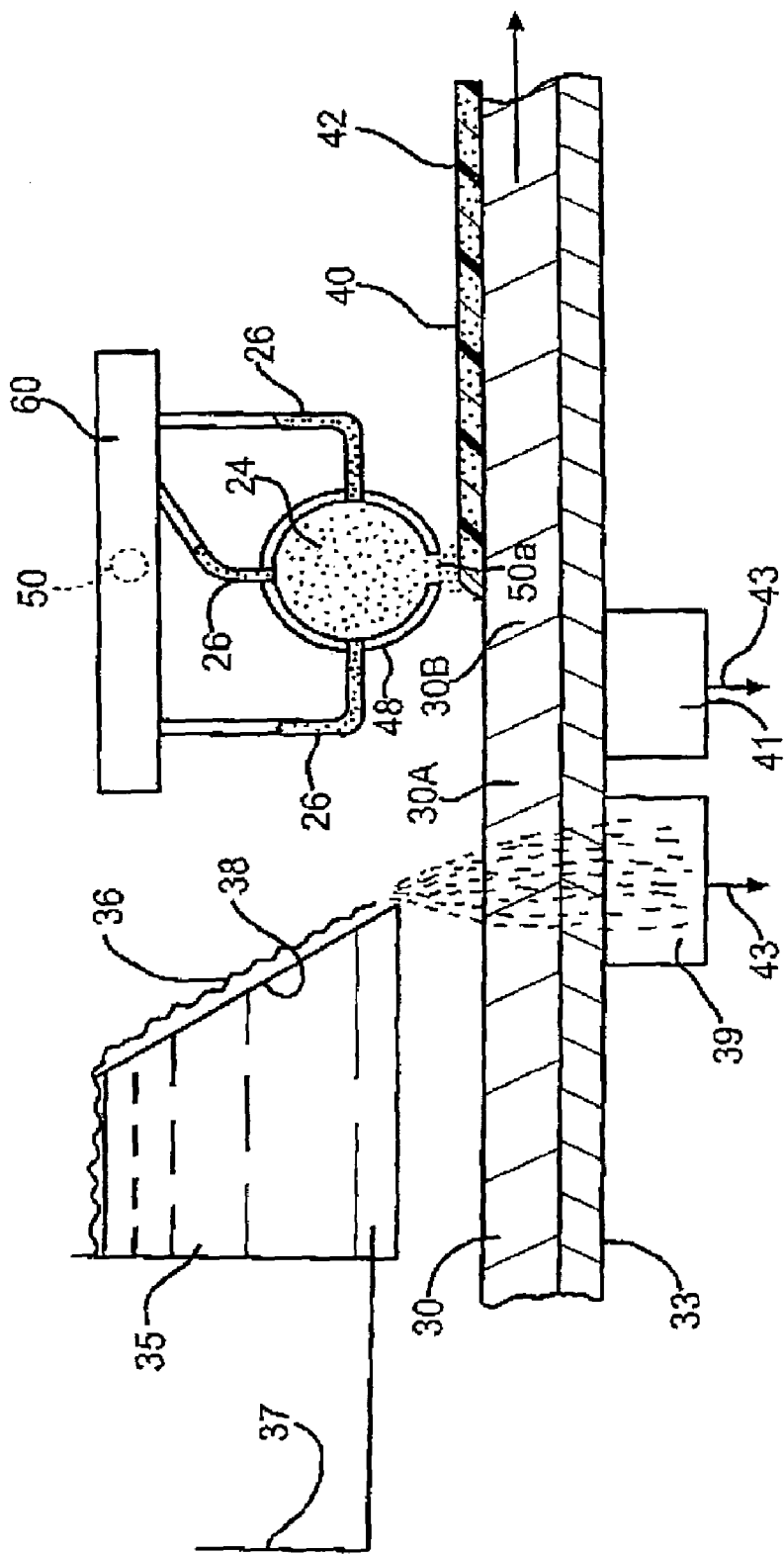
FIG. 2 is a schematic cross section of a portion of the process line of FIG. 1 showing the binder application portion and the foam application portion according to the present invention.

The binder mix can be prepared continuously or in batches as is well known. When prepared continuously, all ingredients of the mix are carefully metered in known ways to insure that the desired composition of the finished mat is maintained. When the aqueous binder mix is applied to the wet nonwoven web 30 (FIG. 2), the binder mix will saturate the wet nonwoven fibrous mat. Preferably, excess aqueous binder slurry is applied using the curtain coater 35, such as supplied by North County Engineers of Glens Falls, N.Y., but other known methods of application and equipment that will also handle the particles and/or fibers in the binder and that will apply this at the rate required to the top of the wet body portion of the mat will work.

A second applicator, a foam applicator 48 is mounted just downstream from of the second suction box 41, but above the second moving screen 33 (see also FIG. 2) and the wet, binclered web 30B, in a similar manner as the binder applicator 35. The foam applicator 48 can be any foam coater applicator, but shown here is a conventional pipe slot applicator 48. The preferred type of foam applicator is a Zimmer Variopress® shown in FIG. 3 and which will be described in more detail below.

An aqueous foam according to the present invention is prepared in foam generator 54 using a high shear type mixer, such as a pinned drum mixer or foam generator available from Gaston Systems. Inc. of Stanley, N.C., or Lessco Company of Dalton, Ga., or any suitable equivalent foam generator for this purpose and forced to the foam applicator 48 through line 50 into manifold 60 which divides into multiple lines 26 that enter the foam applicator 48 spaced along and around the pipe slot applicator 48. A positive displacement pump 56, which can be any type of positive displacement pump, pumps an aqueous foam precursor into the foam generator 54 and the high shear action inside the foam generator 54 produces foam 24 whose pressure due to expansion forces the foam through the lines 50 and 26 into the applicator 48 where it is extruded through a slot 50a onto the top surface of the moving wet, bindered web 30B to form a foam coating 40 (see FIG. 2) and a foam coated, wet bindered, fibrous web 42. The rate of foam extrusion through the slot 50 is controlled by the pumping rate of the positive displacement pump 56.

As can be seen, the foam penetrates the top of the wet, non-woven, bindered web or mat 30B slightly. The type of foam used is carefully selected and controlled to prevent the foam from penetrating further into the wet, bindered web 30B. Foam coating continuous layer or a continuous foam coating layer 40 has en advantage, because of its very high viscosity under low shear, i. e. it sits on top of the wet web without excessive penetration after application. The aqueous binder in the bindered web 30B also helps prevent deeper penetration by the foam. The application rate of foam to the wet, bindered web 30B, and thus the thickness of the foam layer or coating 40, is controlled by the controlling the speed of the pen-neabie belt 33, the rate of foam pumped to the foam applicator 48 by the foam pump 54 and the foam density.

The foam coated, wet, bindered, fibrous web 42 is next transferred to a moving conventional permeable, oven belt 34 in a known manner and run through an oven 57 to dry the wet, foam coated, bindered, fibrous web 42, to collapse the foam layer by breaking or collapsing the bubbles into a coating on the top surface of the mat and to cure (polymerize) the polymeric based resin binder which bonds the fibers together and the coating forming the finished inventive coated fibrous mat 58 which can be wound into a roll 59 using conventional mat winding equipment (not shown). The mat is heated to temperatures of up to about 260 degrees C. in an oven, depending on the type of binder used and/or the nature of the foam on the surface, but other types of dryers and heaters can be used also such as sequential can dryers, a honeycomb oven roll and other ovens used in the art of manufacturing fibrous, nonwoven mats. Non-permeable and low permeable coatings can be produced on the mat by using sequential can dryers or flotation ovens.

Preferably, the foam is applied to the wet, bindered web to produce a wet, foam coated, binder bound, fibrous mat, but the binder is optional. Foam can be applied to a wet web containing no binder in which case the fibers are held together by the coating layer, from foam, on one surface of the mat while the opposite portion of the mat contains no added binder. Nevertheless, the resultant mat has enough strength to enable it to be wound up and unwound for use in making a mat faced laminate. In this latter case, the foam, wet gypsum mix, or other base laminate material penetrates the unbound fiber portion of the mat and bonds the fibers together while also bonding the mat to the base layer.

The fibers, or fibers and particles, in the web portion of the mats of the present invention typically constitute about 40-80 wt. percent of the total weight of the mat and the coating on the mat typically amounts to about 1-35 wt. percent, preferably 1-35 wt. percent of the mat, but most preferably about 1-10 wt. percent. The resin binder content of the mats can vary greatly, but usually is about 10-30 wt. percent of the coated mats of the present invention. One preferred coated mat of the present invention contains about 70+/−5 wt. percent fibers, about 20+/−3 wt. percent binder holding the fibers together and about 10+/−5 wt. percent coating. Another preferred embodiment of coated mat contains 77+/−3 wt. percent fiber, 21+/−2 wt. percent of a conventional vinyl acrylic modified urea formaldehyde latex binder and having a coating on the top surface amounting to about 2+/1.5 wt. percent of the dry coated mat. The mat can have some small spots not coated, but preferably there are no uncoated spots, except for the pores in the mat.

Preferably, the majority of the fibers are glass fibers and most preferably all the fibers are glass fibers, but this invention is equally applicable to ceramic, natural, like wood pulp, manmade cellulosic fibers and polymer fibers and to nonwoven webs made from mixtures of any combination of these types of fibers. While the majority of the fibers are glass fibers in the preferred body portion, all or any portion of non-glass fibers can also be included, such as man made or natural organic fibers like Nylon™, polyester, polyethylene, polypropylene, cellulose or cellulose derivatives, etc.

The fibers used in the nonwoven mat should be at least about 6 millimeters long or longer, more preferably at least about 12 millimeters or 18 millimeters long and most preferably at least about 25 millimeters long, but mixtures of fibers of different lengths and/or fiber diameters can be used as is known. Longer fibers are less expensive and provide higher strength in the mat. It is preferred that these fibers be coated with a silane containing size composition as is well known in the industry.

The glass fibers can be E, C, A, T, S or any known type glass fiber of good strength and durability in the presence of moisture and mixtures of lengths and diameters. Fibers of any diameter can be used, but the preferred fibers are K 137 (about 13 micron average diameter) or M 137 (about 16 micron average diameter) and 117K or M 117 E glass fibers available from Johns Manville International, Inc. of Denver, Colo., but most commercially wet chop glass fiber products are be suitable. A substantial advantage of the present invention is that it enables the use of larger fiber diameters, which are less expensive, while producing a faced product that has a surface that is "user friendly" and non-abrasive. Larger fiber diameters have caused irritation problems in past facer products causing the industry to shift to more costly, smaller diameter fibers like H or G fibers (about 10 or 9 microns average diameter).

The binder used to bond the fibers together can be any conventional aqueous binder capable of bonding the fibers together. A wide variety of binders are used to make nonwovens with urea formaldehyde (UF), acrylic resin, melamine formaldehyde (MF), furan resins, polyester, acrylics, polyvinyl acetate, and urea formaldehyde and melamine formaldehyde binders modified with polyvinyl acetate and/or acrylic being typically used.

The foam used to make the foam coating of the two-layered mat should not penetrate substantially into the aqueous resin binder slurry, but could penetrate slightly. The foam should have a very high blow ratio (or low density) forming a very dry froth. The blow ratio is the density of the foam precursor divided by the density of the wet froth or foam. The blow ratio should be at least 12 and preferably at least 15 and most preferably at least 25. The most preferred range is from about 15 to about 40 such as from about 19 to about 28. The foam density in gms/liter can be calculated by dividing the blow ratio into 1000. Thus, the density of the foam as it enters the foam applicator should be in the range of about 25 to about 83 gms/liter, preferably in the range of about 25 to about 67 gms/liter, and most preferably in the range of about 36 to about 52 gms/liter.

Especially for the slot nozzle foam applicator 48 the foam must be extremely non-draining. For example, when a one-liter Imhoff cone is filled with the wet froth or foam and allowed to stand for 16 hours, less than 5 milliliters and preferably less than 2 milliliters of liquid should collect in the bottom of the cone. When using the Variopress® foam applicator the drainage characteristics of the foam should be such that when one liter of the foam, as it is ready to be inserted into the Variopress®, is placed in an Imhoff cone and left for 10 minutes, no more than 15 milliliters, preferably not more than 10 milliliters and most preferably not more than 2 milliliters of liquid should collect in the bottom of the cone.

The foam should preferably be rapid breaking when exposed to heat due either to the nature of the resin in the foam or the amount of inert fillers in the foam, and not form an impermeable film during drying. The liquid precursor for the foam should have a Brookfield viscosity of at least 200 centipoises and preferably at least 500 centipoises, with a viscosity in the range of about 200 to about 600 being preferred. The foam, when it breaks during drying should not penetrate too far into the fibrous web substrate. One suitable foam is TN-599 available from Noveon (formerly B. F. Goodrich) of Brecksville, Ohio. Any foams meeting the specifications described herein are suitable for the present invention. Preferably, aqueous foams are used. Some other suitable foams are described in the examples.

The type of foam should be selected according to the parameters provided above and the rate of application should be controlled such that the permeability of the dried coated mat is at least 150 or 200 cubic feet per minute per square foot (CFM/sq. ft.) (0.37 or 0.5 cubic meters per minute per square meter). More preferably the permeability of the coated mat is at least 350 (0.9 cubic meters per minute per square meter), most preferably at least 500 CFM/sq. ft (1.29 cubic meters per minute per square meter). Where the foam is applied by continuous extrusion, such as in FIGS. 2 and 3, the foam should be applied at a velocity that approximates the linear speed of the wet web for best results. The importance of permeability in the foam coated mat is to allow hot air to penetrate the coated mat during drying and curing and to allow penetration of the material used subsequently to adhere the coated surface of the inventive mats to another medium, such as an adhesive used to bond a scrim, decorative facing or other material to the foam coated surface of the mat. Another important consideration in certain applications such as when used to face certain insulation media is that the permeability allows the product to "breathe", i. e. to pass air or other gases through the mat facer. Lower permeability to no permeability can be preferred in the final product if drying is done by can or impingement ovens, rather than with a through air oven.

Figure 3:
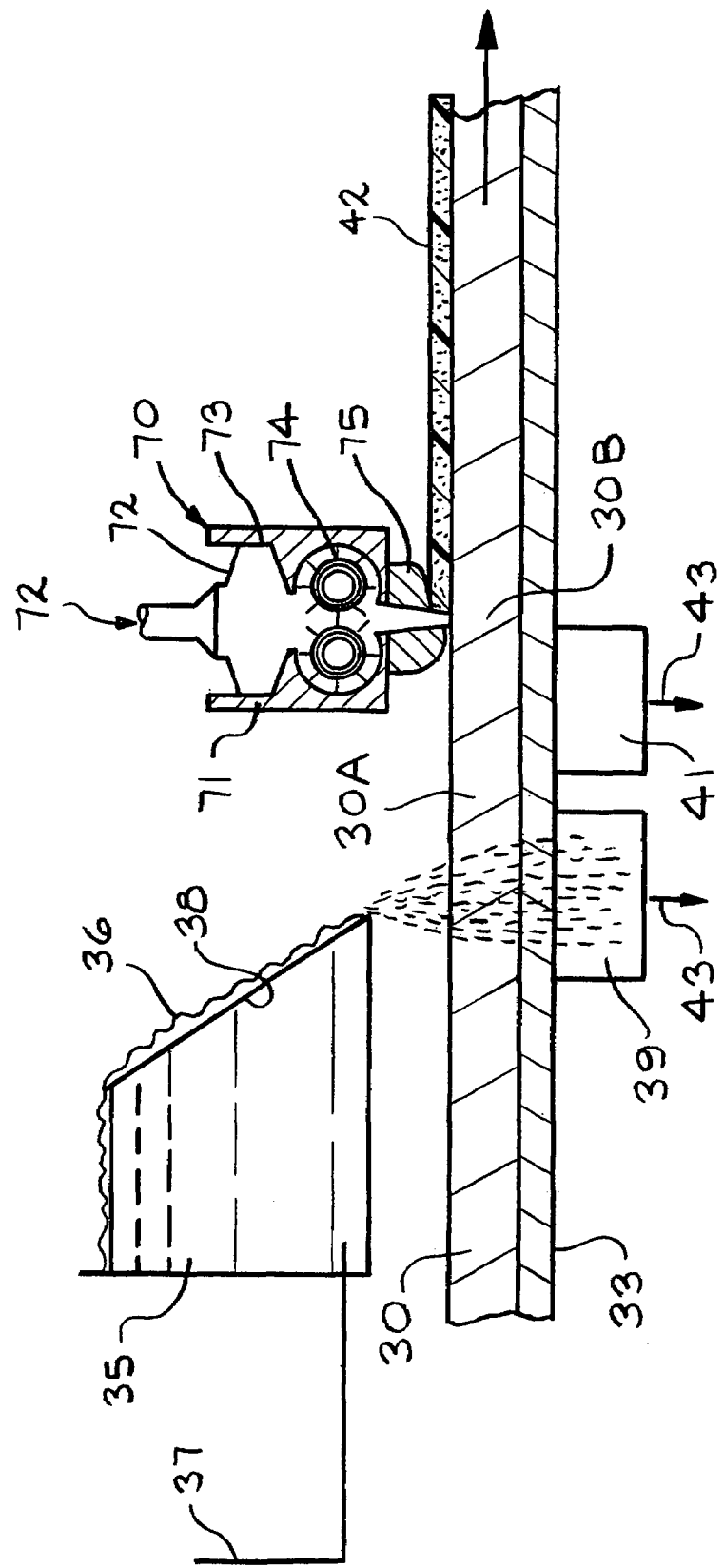
FIG. 3 is a schematic cross section of a portion of the process line of FIG. 1 showing the binder application portion and a preferred embodiment of a foam application portion according to the present invention.

FIG. 3 shows the preferred embodiment of applying foam to the wet mat according to the present invention. This embodiment is the same as the embodiment shown in FIG. 2 except for the binder applicator used. In this embodiment, a foam extruder 70 is used, such as a Zimmer Variopress® foam applicator available from J. Zimmer Maschinenbau Ges. GmbH of Klagenfurt, Austria. The foam 72, as described above, enters foam applicator 70 from above after being pumped in the manner described in the description of FIG. 2 above. The foam 72 flows by gravity down through the foam applicator housing 71 and into two counter rotating gears 73,74, which pump the foam at a desired and controlled rate through an extrusion die 75 and onto the wet, bindered web 30B to form the foam coated, wet, bindered, fibrous web 42. The gear 73 rotates clockwise and the gear 74 rotates counter clockwise. The speed of rotation of the gears 73,74, is variable and can be changed to deliver the desired rate of foam onto the wet, bindered web 30B according to the linear speed of the wet, bindered mat 30B and the desired coating thickness or foam loading of the continuous foam coating layer 40. The Variopress® foam applicator can be raised and lowered in any suitable manner to optimize the application of the foam onto the wet, bindered web 30B. The bottom of the slot should be about 3 to about 50 millimeters, preferably about 6 to about 15 millimeters above the top of the wet, bindered web 30B. The Variopress® foam applicator 70 preferably spans completely across the width of the mat 30B, but need not if only a portion of the width of the wet, bindered web 30B is to be coated with foam.

For the type of foam applicator shown in FIG. 3, preferably the Zimmer Variopress® the drainage of the foam should be as follows. In an Imhoff cone one liter of foam, after standing for 10 minutes, should drain about 1 to about 10, preferably about 1 to about 3 milliliters of fluid. The foam, just prior to insertion into the foam applicator, should have a viscosity in the range of about 2,000 to about 30,000 CPS, preferably in the range of about 1,000 to about 20,000 CPS as measured with an LVF Brookfield viscometer using a helical path with a Type C T-bar running at 6 RPM. The typical bubble diameter of the foam just prior to insertion into the applicator is in the range of about 0.028 to about 0.17 millimeters.

Figure 4:
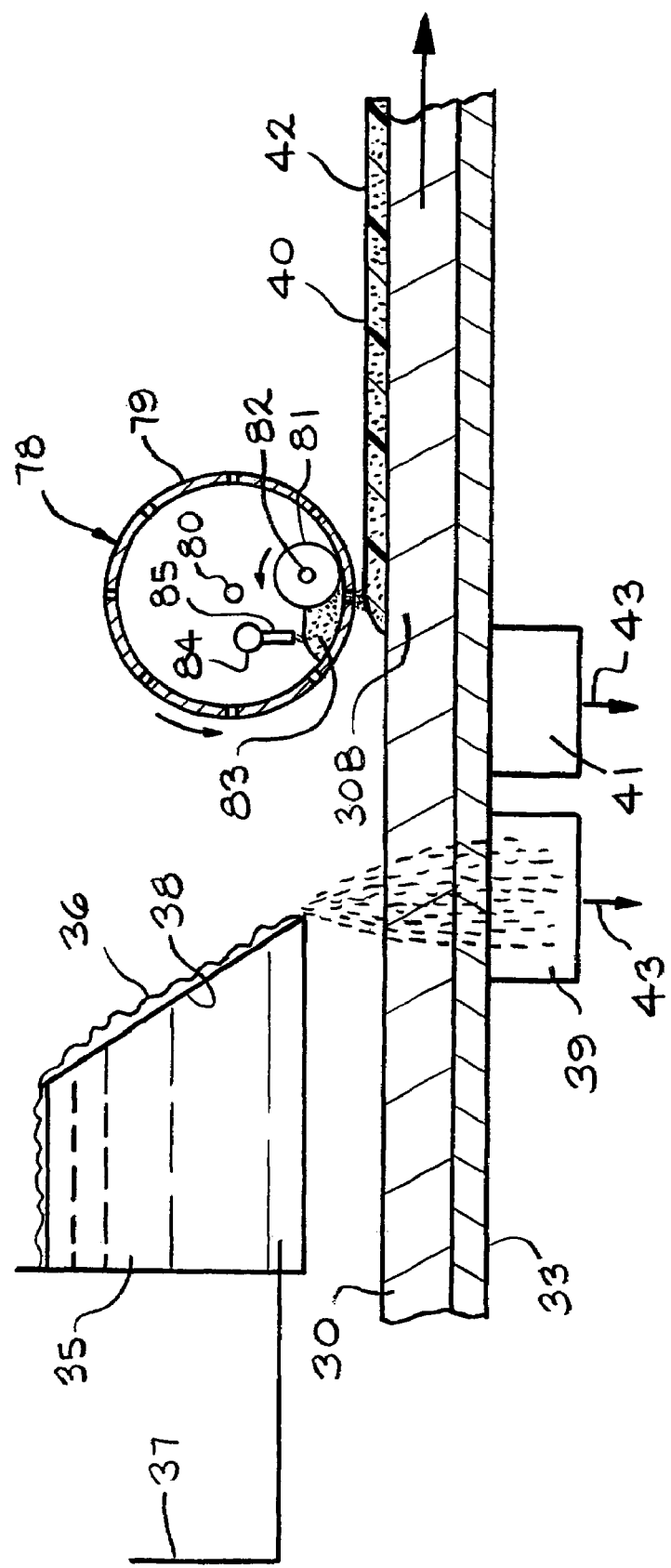
FIG. 4 is a schematic cross section of a portion of the process line of FIG. 1 showing the binder application portion and a still further embodiment of a foam application portion according to the present invention.

FIG. 4 shows a still further embodiment of applying a foam layer onto a wet, bindered web 30B. This embodiment is similar to the embodiments described in FIGS. 2 and 3, except that the foam is applied using a different device. In the embodiment shown in FIG. 4 the foam applicator 78 is a counter clockwise rotating perforated drum 79, such as a Zimmer MAGNOROLL™ available from Zimmer Machinery of Spartanburg, S.C. 29304. The perforated drum 79 is made from a 16H perforated metal screen available from Stork Screens of America of Charlotte, N.C. 28269. The screen used has hexagonal shaped holes that are preferably so close together that foam dots formed on the wet, bindered web 30B from foam extruded through the hexagonal holes flow together to form a continuous foam layer 40, although it is also permissible for some applications if the foam hexagonal dots do not quite flow together.

The perforated drum 79, extending entirely or partially across the width of the web 30 is supported with an axle 50 which can be moved up or down to move the outer surface of the perforated drum 79 closer to or further away from the wet, bindered web 30B, and can also be moved up-line or down-line to optimize the position the foam application in a known manner. A roller 81, supported on a movable shaft 82, is positioned on the interior of the perforated drum 79 near the bottom of the perforated drum 79 and rotates, preferably counterclockwise to force the foam 83 through the holes as they rotate to the bottom of the perforated drum 79 to form the continuous foam layer 40 on the wet web 30B. Foam 83 is pumped in a controlled rate in a known manner as described above to, and distributed along the bottom portion of the perforated drum 79, by a manifold 84 and rectangular nozzle 85. Instead of using the roller 81 to force the foam through the perforated drum 79 a doctor or wiper blade or a contacting slot or feed nozzle can be used as is well known in the art of coating with a perforated drum.

Figure 5:
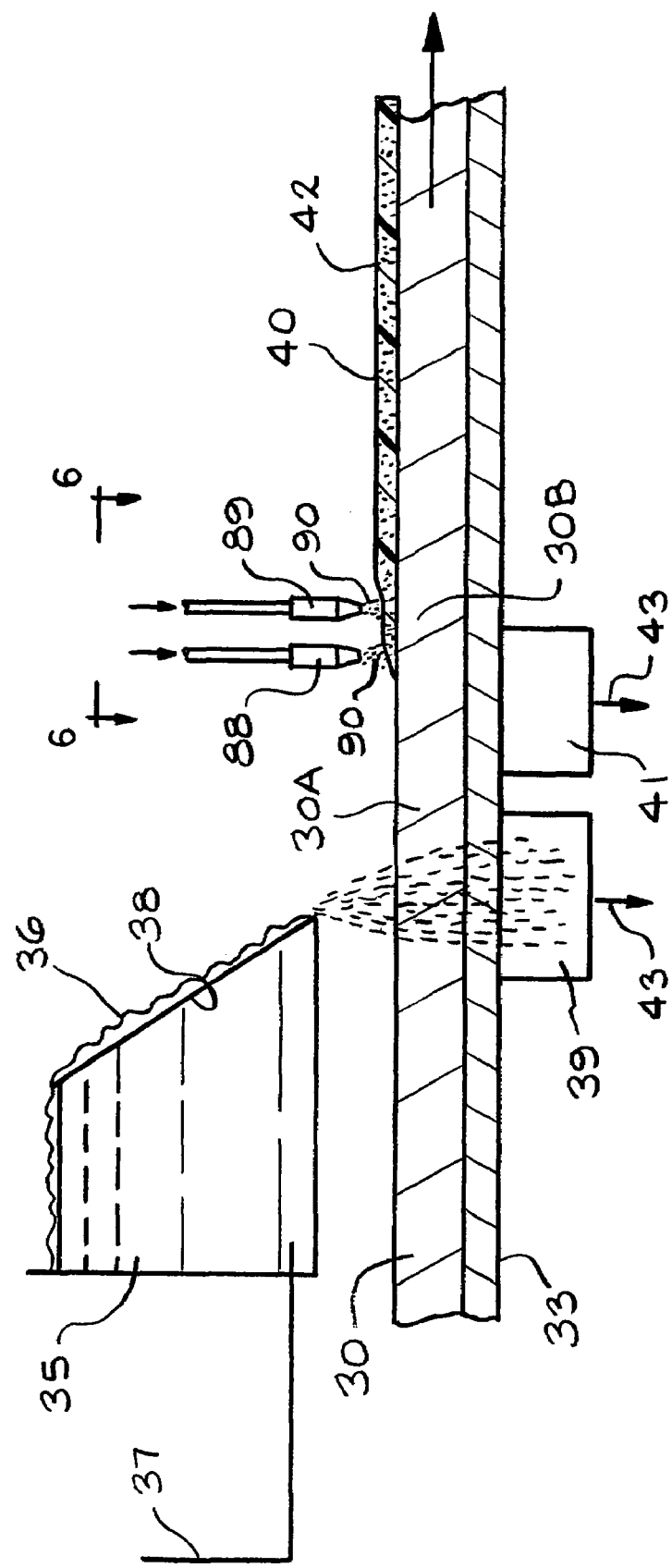
FIG. 5 is a schematic cross section of a portion of the process line of FIG. 1 showing the binder application portion and a still further embodiment of a foam application portion according to the present invention.
Figure 6:
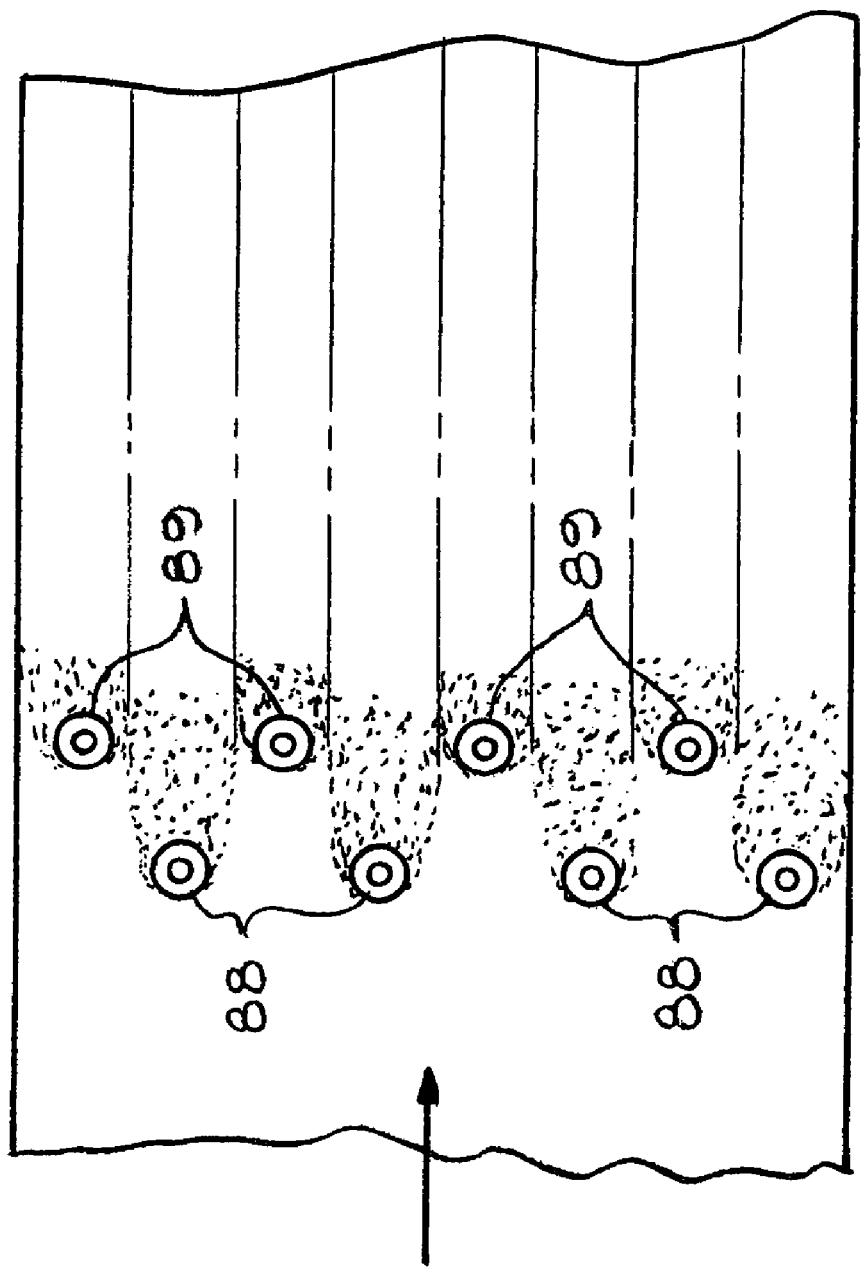
FIG. 6 is a partial plan view of the system shown in FIG. 5 taken along lines 6-6 showing how foam applying nozzles are positioned.

FIG. 5 shows another method of applying a foam coating in-line to a wet non-woven fibrous web 30, preferably a wet, bindered non-woven fibrous web 30B. The system of FIG. 5 is similar to the systems of FIGS. 2, 3 and 4 described above except that the foam applicator is a plurality of nozzles 88,89 mounted above the wet web 30, preferably mounted above the wet, bindered web 308. Foam is pumped in the method described above to a known manifold (not shown) which distributes the foam evenly to a plurality of nozzles 88,89 where the foam 90 is sprayed downwardly on the top surface of the wet web 30 or preferably onto the wet, bindered web SOB to form the continuous foam layer 40. The foam 90 exits the nozzles 88,89 at a velocity that does not disturb the fibrous structure of the wet web 30 or the wet, bindered web 30B. Preferably the nozzles are spaced apart in two staggered rows as shown in FIG. 6 to provide even coverage of foam application onto the wet web 30 or the wet, bindered web 30B. The nozzles 88,89 are mounted on a rack (not shown) in a known manner that allows the nozzles to be moved up and down and up-line and down-line to permit optimization of the foam application to produce the desired foam layer 42. The preferred nozzles are Spraying Systems nozzles 8002 available from Spraying Systems Company, of Wheaton, Ill., with the foam being applied to the nozzles at a pressure of about 2.8 kg/sq. cm, but other nozzles can provide different coating weights and application widths. It is important to note that the nozzles are not generating the foam but merely spraying prepared foam delivered to the nozzles.

EXAMPLE 1

A wet web was formed in a conventional wet process on a laboratory wet former simulating a Voith Hydroformer™ line as used and disclosed in U.S. Pat. Nos. 4,637,496 and 5,772, 846 using M 117 glass fibers one inch long. A fiber slurry was prepared in a well known manner by adding one inch long E glass type M 117 wet chop glass fiber from Johns Manville International, Inc. having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a pilot scale model of a Voith Hydroformer™ where a wet nonwoven mat was continuously formed.

The wet mat was removed from the forming wire and transferred to a second carrier wire running under a curtain coater binder applicator where an aqueous binder slurry was applied to the mat. The aqueous binder was a modified urea formaldehyde resin binder. This aqueous binder was made by adding to an aqueous urea formaldehyde resin, Georgia Pacific 2928 UF resin latex containing 54-56 wt. percent solids, about 7.5 wt. percent, based on the urea formaldehyde solids, of Duraset™ 827, available from Franklin International of Columbus, Ohio, and about 5 wt. percent of hexamethylene tetramine as a cross-linking agent.

The bindered mat was run over a suction box to remove excess binder and then was run under a pipe slot foam applicator where a foam was applied to the top surface. The foam precursor was an inorganic filled latex, UniBond™ 0946, available from UniChem™ Company of Haw River, N.C. The foam precursor had a total solids content of 30 percent and an unfoamed viscosity of 560 centipoises. The foam precursor was converted into a foam on a laboratory LESSCO™ foam unit to a blow ratio of about 30. This produced a stable, wet foam that produced less than two milliliters of liquid in the bottom of an Imhoff cone when allowed to stand for about 16 hours. The foam coated mat was then passed through an air dryer where it was dried and heated to about 177 degrees C. to cure the modified urea formaldehyde binder.

The resultant coated mat had a basis weight of 122.6 gms/sq. meter. The basis weight of the fibrous mat substrate was about 114.7 gms/sq. meter. The LOI of the coated mat was 27.4 weight percent while the LOI of the dry bindered substrate was 23.2 percent of the substrate or 21.7 percent of the coated mat. The coating on the mat amounted to about 5.7 weight percent of the coated mat. The other properties of the coated mat were as follows:

Dry tensile strength—48 kg per 7.6 centimeters width
Hot wet tensile strength—30 kg per 7.6 centimeters width
Air permeability of uncoated bindered mat—1.98 CMM/sq. meter
Air permeability of coated mat of example—1.42 CMM/sq. meter

EXAMPLE 2

Another wet web was formed in the same conventional wet process on a laboratory wet former simulating a Voith Hydroformer™ line as used and disclosed in U.S. Pat. Nos. 4,637,496 and 5,772,846 as used in Example 1. A fiber slurry was prepared in a well known manner by adding 0.75 inch long E glass type K 117 wet chop glass fiber from Johns Manville International, Inc. having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a pilot scale model of a Voith Hydroformer™ where a wet nonwoven mat was continuously formed.

The wet mat was removed from the forming wire and transferred to a second carrier wire running under a curtain coater binder applicator where an aqueous binder slurry was applied to the mat. The aqueous binder was a modified urea formaldehyde resin binder. This aqueous binder was made by adding to an aqueous urea formaldehyde resin, Georgia Pacific 2928 UF resin latex containing 54-56 wt. percent solids, about 7.5 wt. percent, based on the urea formaldehyde solids, of Duraset™ 827, available from Franklin International of Columbus, Ohio.

The bindered mat was run over a suction box to remove excess binder and then was run under nozzles spraying foam as shown in FIG. 5 above where a foam was applied to the top surface. The nozzles were 8002 nozzles available from Spraying System Company of Wheaton, Ill. The nozzles were spaced about 76-79 millimeters apart with the bottom of the nozzles being about 165 millimeters above the to surface of the wet, bindered mat. The foam precursor was the same inorganic filled latex, 914-661-97-75 available from Noveon, Inc. of Cleveland, Ohio. The foam precursor had a total solids content of 35 percent and an unfoamed viscosity of 560 centipoises. The foam precursor was converted into foam on a laboratory LESSCO™ foam unit to a blow ratio of about 10-15. This produced a stable, wet foam that produced less than two milliliters of liquid in the bottom of an Imhoff cone when the cone was filled with one liter of foam and allowed to stand for about 16 hours. The foam had a line pressure of about 2.8 kg/sq. cm to the nozzles and was applied at a rate to produce a dry foam addition of about 16.45 gms/sq. meter. The rate of foam addition to the web per unit area can be increased or decreased by changing the line speed, changing the foam density, changing the foam pressure or by using larger or more application nozzles.

The foam coated mat was then passed through an air dryer where it was dried and heated to about 177 degrees C. to cure the modified urea formaldehyde binder.

The resultant coated mat had a basis weight of 133.5 gms/sq. meter. The basis weight of the fibrous mat substrate was about 110.2 gms/sq. meter. The LOI of the coated mat was 21 weight percent while the LOI of the dry bindered substrate was 16.1 percent of the substrate or 13.3 percent of the coated mat. The coating on the mat amounted to about 4.9 weight percent. The other properties of the coated mat were as follows:

Dry tensile strength—29.5 kg per 7.62 cm width
Hot wet tensile strength—12.3 kg per 7.62 cm width
Air permeability of uncoated bindered mat—1.7 CMM/sq. meter
Air permeability of coated mat of example—0.87 CMM/sq. meter Thus it can be seen that while the foam coating reduced the permeability of the mat about 21 percent, the foam coating did not substantially reduce the permeability of the bindered mat and thus did not greatly inhibit its drying in an air dryer. This is important because if it were to substantially reduce the permeability, for example by about 50-75 percent or more, the line speed would have to be slowed substantially, increasing the manufacturing cost substantially.

EXAMPLE 3

Example 2 was duplicated except for the type of foam used and the basis weight of the finished mat that in this example was 64.3 gms/sq. meter. Also, an uncoated, bindered mat of the same kind as the bindered mat used to make the coated mat was made as a control. In this example a fluoropolymer was used. The fluoropolymer used was Sequapel NRL available from Omnova Solutions of Chester, S.C. The properties of fluorpolymer coated mat and the control mat were as follows:

Control mat LOI—27.6 percent
Coated mat LOI—29.1
Amount of foam addition—about 1.5 wt. percent of finished mat
Permeability of control mat—1.66 CMM/sq. meter
Permeability of coated mat—1.6 CMM/sq. meter
Dry tensile strength of control mat—39.6 kg/7.62 cm width
Dry tensile strength of coated mat—33.2 kg/7.62 cm width
Hot wet tensile of control mat—18.3 kg/7.62 cm width
Hot wet tensile of coated mat—15.4 kg/7.62 cm width The coated mat was tested for repellency to a 50 percent concentration in water isopropyl alcohol using an accepted test and the coated mat passed the test while the control mat failed badly.

EXAMPLE 4

A fibrous mat was made using 1.9 cm long 13 micron average diameter glass fiber using the web forming process described in Example 1 above except that a production sized Voith Hydroformer® was used to make the wet web. The web was formed to constitute about 77 wt. percent of the finished mat. Enough conventional aqueous vinyl acrylic modified urea formaldehyde binder was left in the mat after being added with a production curtain coater and controlled as described in Example 1 so that the binder content of the resultant mat was about 21 dry wt. percent.

A foam was applied to the top of the wet mat using a Zimmer Variopress® was as follows:

Type—Performax™ 3729A, a styrene butadiene rubber aqueous foam precursor at a concentration of 10 wt. percent solids, available from Noveon as above.

Foam generation—E.T. Oakes Company—Model 14 M Foamer operated to produce a foam density of 38.9 gms/liter, a foam viscosity in the range of about 2500-4700 CPS (Brookfield with helical path and Type C T-bar at 6 RPM), and a drainage of 10 ml of liquid draining from one liter of foam in an Imhoff cone after 10 minutes.

Enough foam was applied to the wet bindered mat to produce a final coating of basis weight of 5-8 grams per sq. meter of mat. The foam coated mat was then run through a production dryer on a moving wire screen belt where it was dried and cured to about 210 degrees C. The dried and cured mat had a few uncoated spots, about 1 having an average diameter of about 15 millimeters per 92 sq. meters. This mat had a basis wt. of about 114 gms/sq. meter, a permeability ranging from about 1.03 to about 1.55 CMM/sq. meter and performed acceptably as a facer for gypsum board.

EXAMPLE 5

A fibrous mat was made using the same composition, forming conditions and binder application conditions and equipment as used in Example 4, but a different foam was used.

Type—Performax™ 3729B, a styrene butadiene rubber aqueous foam precursor at a concentration of 12 wt. percent solids, available from Noveon as above.

Foam generation—E.T. Oakes Company—Model 14 M Foamer operated to produce a foam density of 37.4 gms/liter, a foam viscosity in the range of about 14,500-18,300 CPS (Brookfield with helical path and Type C T-bar at 6 RPM), and a drainage of 1.5 ml of liquid draining from one liter of foam in an Imhoff cone after 10 minutes.

Enough foam was applied to the wet bindered mat to produce a final coating of basis weight of 5-8 grams per sq. meter of mat. The foam coated mat was then run through a production dryer on a moving wire screen belt where it was dried and cured to about 210 degrees C. The dried and cured mat had no uncoated spots on the mat except for the pores in the mat. This mat had a basis wt. of about 114 gms/sq. meter, a permeability ranging from about 1.03 to about 1.55 CMM/sq. meter and performed fine as a facer for gypsum board.

This inventive method of foam coating on-line in a wet forming mat process completely eliminates the need for the more costly off-line foam coating process currently being used to make coated mats by either coating off line and again drying and curing a second time or coating in-line after drying and curing and then running the coated mat through a second oven on-line.

While the above examples produced mats in which the foam had broken down completely or almost completely during the drying and curing, the invention also includes selecting a foam that does not collapse or does not collapse very much in which cases the finished mat will have a thin foamed coating which is also useful for many of the same reasons already stated for the coated mat and further to provide better thermal insulation, a cushion layer and other benefits. Foams, including aqueous foams, having much better heat stability than the foams described above that collapse during drying and curing are well known in foam technology and can be selected for these embodiments. Such foams contain greater amounts of surfactant or other foam stabilizer or contain different surfactants or other foam stabilizer than the foams described in detail above. If the foam selected to make a cured foam coating does not collapse very much it will be necessary to substantially reduce the line speed to dry the mat or to dry and cure using a flotation dryer or sequential can dryer.

The invention produces novel mats in which the coating prevents shedding of fibers from the face that is exposed after laminating to intermediate products or used to face products like gypsum board, insulation boards or blankets. It also presents a friendly surface, reducing abrasion or irritation caused by frequent handling of current glass mat faced products, particularly in hot, humid conditions. Further, this inventive method can also be used to coat the surface of a mat with a fire retardant or in tumescent coating, a heat activating adhesive coating or other adhesive coating, colored coatings and other functional coatings by incorporating the functional ingredient(s) in the foam precursor or wet foam in a known manner. Incorporating the functional ingredient in the foam coating instead of in the mat, as was often the done in the past requires less functional ingredient further reducing the manufacturing cost.

The coated mats can be bonded to a gypsum wallboard, insulating boards of various types and combustible substrates, like a wood product such as hardboard, particle board, chip board, oriented strand board or plywood. With gypsum board, the wet gypsum mix can be formed against the uncoated surface of the coated mat to bond to the fibrous web. In the case of combustible substrates the coated mat can be adhered with any known adhesive fire resistant adhesive with the uncoated web of the mat against the combustible material.

While the preferred embodiments of the invention have been disclosed in detail, other embodiments within the described invention and having other functional additives known or obvious to those skilled in the art are considered to be part of the present invention and are intended to be included in the invention claimed below.

We claim:

1. A method of making a permeable fibrous facer mat on a wet process mat machine in which an aqueous slurry containing fibers, the majority of fibers being glass fibers having a length of at least about 6 mm and an average diameter of at least about 13 microns, is continuously deposited onto the top surface of a moving permeable forming belt, is partially dewatered to form a wet fibrous web, is saturated with an aqueous binder, is again partially dewatered to form a wet, bindered web and is dried to produce a dry non-woven fibrous mat, the improvement comprising making a facer mat having improved flexibility and less irritable handling characteristics by applying a foam or froth, having a blow ratio of at least 15 and being extremely non-draining such that when one liter of the foam is placed in an Imhoff cone and allowed to set for 16 hours, the amount of liquid formed in the bottom of the Imhoff cone is less than about 5 milliliters, onto a top face of the wet, bindered web, the foam or froth having a high percentage of air, and applying said foam at a rate to produce a dry mat having a continuous coating, amounting to about 3-15 grams per square meter of mat, on one face and drying the mat in a manner to break or collapse bubbles in the foam to increase the air permeability of the mat to at least about 150 cubic feet per minute per square foot of mat and to produce a fibrous nonwoven mat having a coating on one surface.

2. The method of claim 1 wherein the blow ratio of the form or froth is at least about 19 to about 28.

3. The method of claim 1 wherein at least a majority of the fibers are glass fibers and said foam is selected and applied to produce a permeability of at least about 200 cubic feet per minute per square ft. in the dry, coated mat.

4. The method of claim 1 wherein said foam is selected and applied to produce a permeability of at least about 350 cubic feet per minute per square ft in the dry, coated mat.

5. The method of claim 1 wherein the majority of glass fibers have a length of about 12 mm and said foam is selected and applied to produce a permeability of at least about 500 cubic feet per minute per square ft in the dry, coated mat.

6. The method of claim 1 wherein the foam has a density in the range of about 33.3 and 66.7 grams/liter prior to being applied.

7. The method of claim 3 wherein the foam has a density in the range of about 33.3 and 66.7 grams/liter prior to being applied.

8. The method of claim 4 wherein the foam has a density in the range of about 33.3 and 66.7 grams/liter prior to being applied.

9. The method of claim 5 wherein the foam has a density in the range of about 33.3 and 66.7 grams/liter prior to being applied.

10. The method of claim 1 wherein the foam is such that when one liter of the foam is placed in an Imhoff cone and allowed to set for 16 hours, the amount of liquid formed in the bottom of the Imhoff cone is less than about 2 milliliters.

11. The method of claim 6 wherein the foam is such that when one liter of the foam is placed in an Imhoff cone and allowed to set for 16 hours, the amount of liquid formed in the bottom of the Imhoff cone is less than about 2 milliliters.

12. The method of claim 7 wherein the foam is such that when one liter of the foam is placed in an Imhoff cone and allowed to set for 16 hours, the amount of liquid formed in the bottom of the Imhoff cone is less than about 2 milliliters.

13. The method of claim 8 wherein the foam is such that when one liter of the foam is placed in an Imhoff cone and allowed to set for 16 hours, the amount of liquid formed in the bottom of the Imhoff cone is less than about 2 milliliters.

14. The method of claim 9 wherein the foam is such that when one liter of the foam is placed in an Imhoff cone and allowed to set for 16 hours, the amount of liquid formed in the bottom of the Imhoff cone is less than about 2 milliliters.

15. The method of claim 3 wherein the foam is such that when one liter of the foam is placed in an Imhoff cone and allowed to set for 16 hours, the amount of liquid formed in the bottom of the Imhoff cone is less than about 10 milliliters.

16. The method of claim 1 wherein the foam is selected to have a good heat stability and does not completely collapse during drying and curing, leaving a foam coating on one surface of the mat.

17. The method of claim 2 wherein the foam is selected to have a good heat stability and does not completely collapse during drying and curing, leaving a foam coating on one surface of the mat.

18. The method of claim 1 wherein the foam also contains one or more functional ingredients to provide additional functionality to the coating.

19. The method of claim 2 wherein the foam also contains one or more functional ingredients to provide additional functionality to the coating.

20. The method of claim 3 wherein the foam also contains one or more functional ingredients to provide additional functionality to the coating.

21. The method of claim 1 in wherein the foam is applied with a foam extruder.

22. The method of claim 7 in which the foam is applied with a foam extruder.

23. A method of making a permeable fibrous mat on a wet process mat machine in which an aqueous slurry containing fibers, the majority of fibers being glass fibers having a length of at least about 6 mm and an average diameter of at least about 13 microns, is continuously deposited onto the top surface of a moving permeable forming belt to form a wet web, partially dewatered, followed by saturating the partially dewatered, wet web with an excess of aqueous binder, removing the excess aqueous binder to form a wet, bindered web and drying the wet, bindered web to produce a dry non-woven fibrous mat, the improvement comprising making a facer mat having improved flexibility and less irritable handling characteristics by applying a foam onto a top face of the wet, bindered web before said web is dried, the foam having a high percentage of air having a density of below 83.3 gms/liter, the foam being extremely non-draining such that when one liter of the foam is placed in an Imhoff cone and allowed to set for 16 hours, the amount of liquid formed in the bottom of the Imhoff cone is less than about 5 milliliters, and applying said foam at a rate to produce a dry mat having a continuous coating, amounting to about 3-15 grams per square meter of mat, on one face, and heating the foam coated mat to at least partially collapse the foam to produce a dry mat having a permeability of at least about 150 cubic feet per minute per square ft.

24. The method of claim 23 wherein at least the majority of the fibers are glass fibers and said foam is applied at a rate to produce a dry mat having a permeability of at least about 200 cubic feet per minute per square ft.

25. The method of claim 23 wherein the majority of glass fibers have a length of at least about 12 mm, said foam is applied at a rate to produce a dry mat having a permeability of at least about 350 cubic feet per minute per square ft.

26. The method of claim 23 wherein the loam has a density just prior to the applicator of less than 40 gms/liter.

27. The method of claim 24 wherein the foam has a density just prior to the applicator of less than 40 gms/liter.

28. The method of claim 25 wherein the foam has a density just prior to the applicator of less than 40 gms/liter.

29. The method of claim 23 wherein the amount of liquid formed in the bottom of the Imhoff cone is less than about 2 millimeters.

30. The method of claim 24 wherein the amount of liquid formed in the bottom of the Imhoff is less than about 2 millimeters.

31. The method of claim 25 wherein the amount of liquid formed in the bottom of the Imhoff cone is less than about 2 millimeters.

32. The method of claim 26 wherein the amount of liquid formed in the bottom of the Imhoff cone is less, than about 2 millimeters.

33. The method of claim 27 wherein the amount of liquid formed in the bottom of the Imhoff cone is less than about 2 millimeter.

34. The method of claim 23 wherein the foam also contains one or more functional ingredients to provide additional functionality to the coating.

35. The method of claim 23 in which the foam is applied with a foam extruder.

36. The method of claim 25 in which the foam is applied with a foam extruder.

37. The method of claim 28 in which the foam is applied with a foam extruder.

* * * * *